United States Patent [19]

Swanson

[11] 4,261,535
[45] Apr. 14, 1981

[54] STREAMLINE AFTERBODY FOR AN EJECTION SEAT

[75] Inventor: Douglas E. Swanson, Seattle, Wash.

[73] Assignee: The United States of America as represented by the Secretary of the Air Force, Washington, D.C.

[21] Appl. No.: 82,353

[22] Filed: Oct. 5, 1979

[51] Int. Cl.³ .............................................. B64C 7/00
[52] U.S. Cl. .............................. 244/130; 244/122 A; 244/141; 102/4; 102/34.1; 296/1 S
[58] Field of Search ............ 244/130, 122 A, 122 AE, 244/141, 140, 2, 5, 49, 87, 3.27; 102/4, 34.1; 296/1 S

[56] References Cited

U.S. PATENT DOCUMENTS

| | | | |
|---|---|---|---|
| 2,702,680 | 2/1955 | Heinemann et al. | 244/140 |
| 2,733,027 | 1/1956 | Gero | 244/140 |
| 2,737,411 | 3/1956 | Potter | 296/1 S |
| 3,042,347 | 7/1962 | Halsey | 244/141 |
| 3,286,951 | 11/1966 | Kendall | 244/138 R |
| 3,372,893 | 3/1968 | Larsen et al. | 244/138 R |
| 3,412,962 | 11/1968 | Killian | 244/130 |
| 3,432,125 | 3/1969 | Schroeder, Jr. | 244/130 |
| 3,618,877 | 11/1971 | Peters et al. | 244/87 |
| 3,679,157 | 7/1972 | Roberts et al. | 244/141 |
| 4,005,655 | 2/1977 | Kleinschmidt et al. | 102/4 |

Primary Examiner—Galen L. Barefoot
Attorney, Agent, or Firm—Donald J. Singer; Arsen Tashjian

[57] ABSTRACT

The ejection seat on a high performance aircraft is provided with a plurality of inflatable air bags on the back of the seat. The air bags are generally elliptical in cross-section and arranged one above the other in two parallel vertical rows on a supporting pallet attached to the seat back. Suitable gas generators cause the air bags to inflate in sequence top-to-bottom as the seat ejects from the aircraft to produce a rearwardly extending generally streamline afterbody thereby reducing aerodynamic drag and stabilizing the seat with its occupant after emergency ejection.

3 Claims, 7 Drawing Figures

STREAMLINE AFTERBODY FOR AN EJECTION SEAT

STATEMENT OF GOVERNMENT INTEREST

The invention described herein may be manufactured and used by or for the Government for governmental purposes without the payment of any royalty thereon.

BACKGROUND OF THE INVENTION

This invention relates to a streamline afterbody for attachment to the ejection seat on an aircraft and, more particularly, the invention is concerned with providing an inflatable afterbody for stabilizing the seat and reducing aerodynamic drag following an emergency ejection by causing a series of elongated air bags to inflate sequentially during ejection to form the streamline afterbody on the back of the ejection seat.

Heretofore, it has been common practice to attempt to solve the problems of emergency escape at high dynamic pressures by providing crew escape capsules of various types. One type of escape capsule includes a separable cockpit section which is ejected along with the seat and occupant. This arrangement involves high development costs and also adds unwanted weight to the aircraft. Another emergency escape system includes an encapsulated seat. Like the separable cockpit arrangement, the encapsulated seat is costly and adds considerable weight to the aircraft.

Since the current ejection seats are ineffective under dynamic pressure conditions between 1200 psf and 2000 psf because of aerodynamic instability and wind drag deceleration beyond human limits, it is necessary to provide means for stabilizing the seat and reducing aerodynamic drag during emergency ejection. The hereinafter described invention does provide an afterbody for streamlining the wake behind the seat as well as creating stabilizing aerodynamic forces to allow safe ejection from the aircraft. The invention will operate at altitudes of up to 80,000 ft, at dynamic pressures up to 2000 psf, at Mach numbers from 0 to 30 and at aircraft load factors up to 10 g's.

SUMMARY OF THE INVENTION

The present invention is concerned with providing a streamline afterbody which is suitable for attachment to the back of an ejection seat on a high performance aircraft. The purpose of the afterbody is to stabilize the seat and reduce aerodynamic drag during emergency ejection especially under dynamic pressure conditions between 1200 psf and 2000 psf. A plurality of inflatable air bags are attached to a supporting pallet on the back of the ejection seat. A cool gas generator inflates the air bags in sequence as the seat ejects from the aircraft producing a rearwardly extending streamline afterbody.

Accordingly, it is an object of the invention to provide a streamline afterbody for an ejection seat to allow ejection from the aircraft under dynamic pressure conditions between 1200 psf and 2000 psf without injury to the crew member.

Another object of the invention is to provide a streamline afterbody for an ejection seat wherein the seat is stabilized and the aerodynamic drag is reduced during an emergency ejection.

Still another object of the invention is to provide an ejection seat having a streamline afterbody to prevent aerodynamic instability and wind drag deceleration beyond human limits.

A further object of the invention is to provide an ejection seat with a streamline afterbody including a series of rearwardly extending inflatable air bags automatically deployed during ejection from the aircraft.

A still further object of the invention is to provide an ejection seat with an inflatable afterbody having gas generator units which cause air bags to become sequentially inflated as the set ejects. The air bags which are elongated elliptically shaped when inflated and deployed, streamline the wake behind the seat and create stabilizing aerodynamic forces.

These and other objects, features and advantages will become more apparent after considering the following detailed description taken in conjunction with the annexed drawings and appended claims.

DESCRIPTION OF A PREFERRED EMBODIMENT

Figure 1:
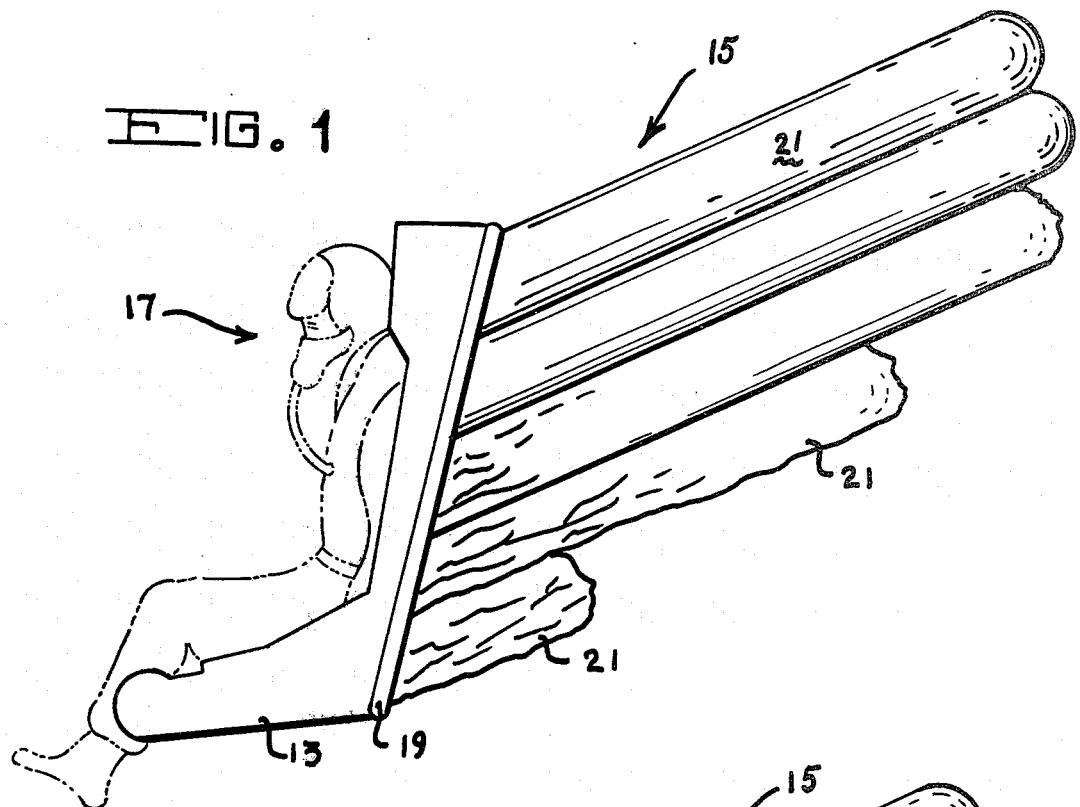
FIG. 1 shows the ejection seat according to the invention in the partially deployed mode with the air bags being inflated while the seat is ejecting.
Figure 2:
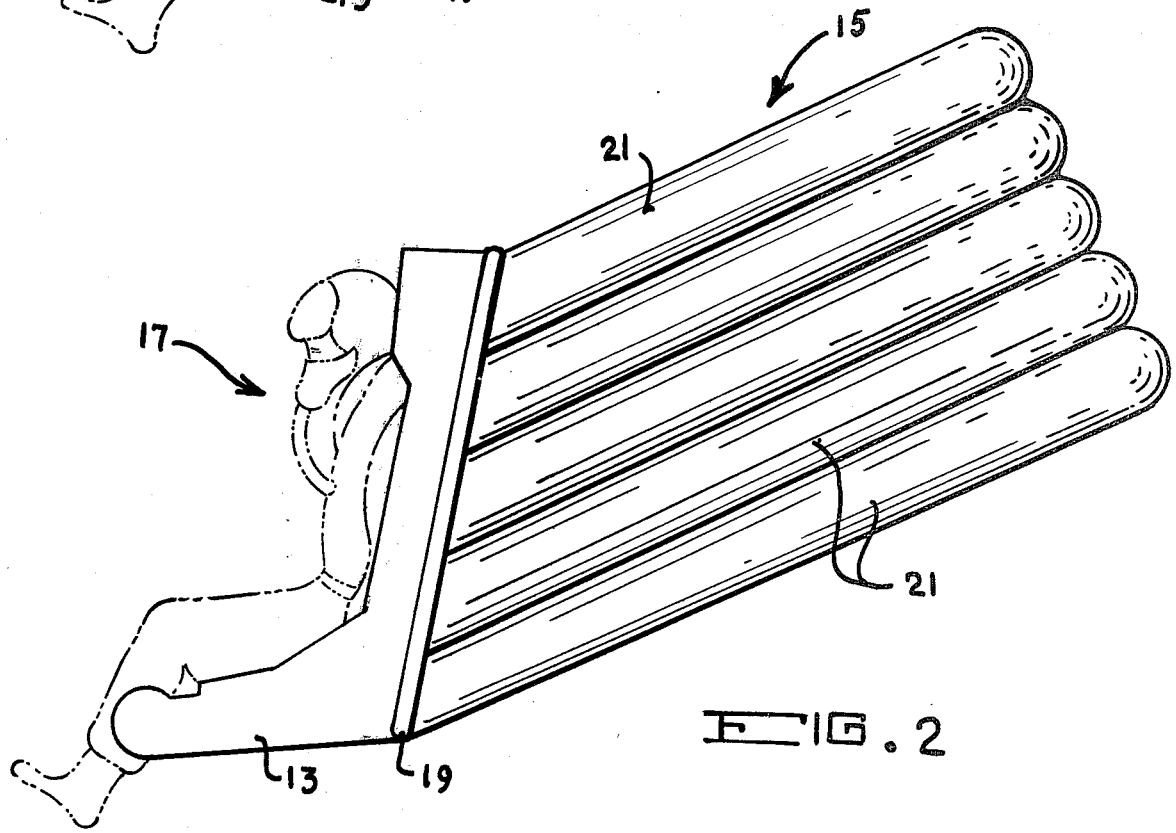
FIG. 2 shows the ejection seat of FIG. 1 in the fully deployed mode with the streamline afterbody extending rearwardly to create stabilizing aerodynamic forces.
Figure 7:
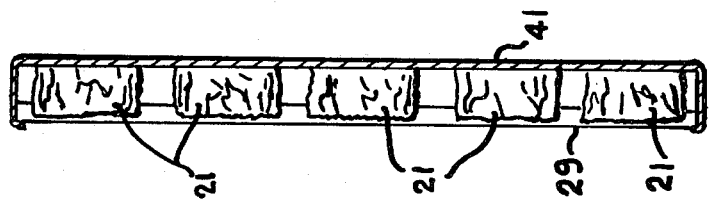
FIG. 7 is a side view in cross section of the streamline afterbody of FIG. 6 attached to the support pallet showing the air bag fully deflated.

Referring to the drawings wherein like reference numerals refer to like elements in the several views, FIGS. 1 and 2 show an ejection seat 13 with an afterbody 15 attached thereto. The ejection seat 13 supports the crew member 17 and provides the structure for mounting the pallet 19, shown in tail in FIG. 3. The afterbody 15 is made up of a plurality of air bags 21 which extend rearwardly from the back of the ejection seat 13. In FIG. 1, the air bags 21 are shown in condition during ejection with the upper bags fully inflated and the lower bags partially inflated. In FIG. 2, all of the air bags 21 are fully inflated and the ejection seat 13 is fully deployed with the afterbody 15 serving to streamline the wake behihd the seat and create stabilizing aerodynamic forces.

Figure 3:
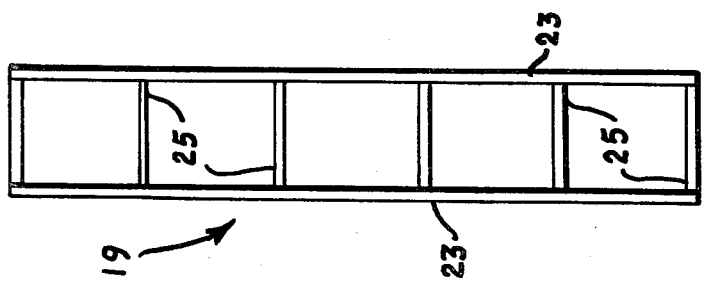
FIG. 3 is a plan view of the support pallet which is attached to the back of the ejection seat with the side rails and cross bar structural members.

The support pallet 19 which is shown most clearly in FIG. 3 includes two side rails 23 which are structurally attached to the back of the ejection seat 13 and a series of structural crossbars 25 positioned between the rails 23. Most current ejection seats can be easily modified to accept the support pallet 19. Mounting brackets (not shown) on the back of the seat 13 connect the support pallet 19 to the seat and pivot on the rails 23 lock the pallet 19 to the seat 13.

Figure 4:
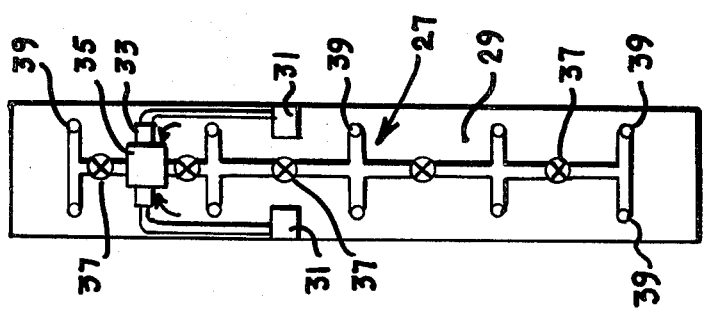
FIG. 4 is a schematic showing of the pneumatic circuit which supplies the air to the inflatable air bags.

The pneumatic system 27 and the inflatable air bags 21 are mounted on the support pallet 19. The pallet framework which includes two rails 23 and six cross bars 25 is provided with a rigid skin cover 29 to which the inner ends of the inflatable air bags 21 are attached. The pneumatic system 27 (shown in FIG. 4) which inflates the afterbody 15 includes two cool gas generators 31 for producing the gas used to inflate the afterbody 15. A check valve 33 is positioned between the gas generators 31 and a plenum 35 to prevent the gas from one gas generating unit 31 from reaching the other. The gas mixes in the plenum 35 and builds pressure with all of the five shut-off valves 37 being initially closed. As the seat 13 with the pallet 19 attached moves up, the valves 37 are sequentially opened beginning at the top. The gas then enters the air bags 21 through the inlet ports 39 and when the air bags 21 are completely inflated, the afterbody 15 is formed.

Figure 5:
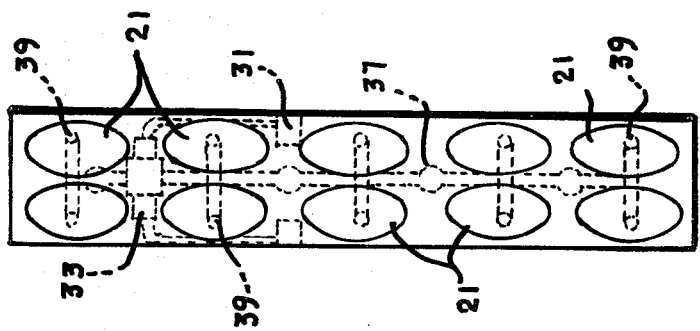
FIG. 5 is a view showing the position of the rows of air bags attached to the support pallet in FIG. 3 with the pneumatic circuit shown in phantom.

The air bags 21 are arranged in two parallel vertical rows of five each as shown in FIG. 5. The bags 21 are elliptical in configuration and are attached to the pallet skin 29. In order to provide for easy stowage, the air bags 21 are made of a flexible airtight fabric to allow them to be compacted. Each air bag 21 is individually packaged and sealed to protect them prior to use. During emergency escape situations, the bags 21 fully inflate extending aft of the seat 13 to streamline the wake behind the seat and create stabilizing aerodynamic forces.

Figure 6:
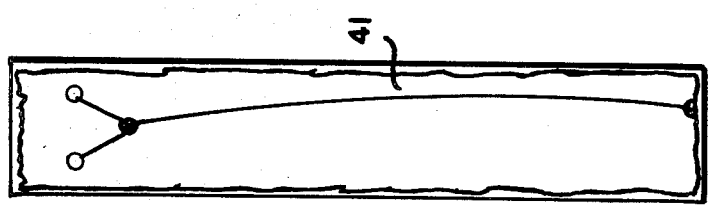
FIG. 6 is a plan view of the streamline afterbody with the protective cover in position.

A protective cover 41 shown in FIG. 6 shields the bags 21 and components from contamination during daily operations. This fabric cover 41 is stretched over the air bags 21 and connected to the pallet framework 23. During an emergency escape, the protective cover 41 is automatically removed from the pallet 19.

In operation, the afterbody 15 is automatically deployed during an ejection from an aircraft. The pilot initiates the escape sequence by pulling a firing handle. The signal from this initiation procedure is used to simultaneously ignite the cool gas generators 31 and ignite the propulsion unit on the seat 13. The propulsion unit forces the seat 13 up and out of the aircraft. The gas generators 31 inflate the afterbody 15.

The protective cover 41 is drawn off the pallet 19 as the seat 13 begins to move up. The top two air bags 21 begin to inflate as soon as they clear the cockpit. Each succeeding pair of air bags 21 likewise begin inflation as they clear the cockpit. By the time the seat 13 leaves the aircraft, the upper air bags 21 are fully inflated and the lower bags are partially inflated (see FIG. 1). When the lower bags complete filling as in FIG. 2, the total assembly stabilizes the seat 13 and reduces aerodynamic drag. The drag reduction occurs because the wake behind the seat is streamlined.

Although the invention has been illustrated in the foregoing specification in terms of a preferred embodiment thereof, the invention is not limited to this embodiment or to the particular configuration shown and described. It will be apparent to those skilled in the art that certain changes, modifications and substitutions can be made with respect to the shape of the elements without departing from the true spirit and scope of the appended claims. It can be seen that the invention can be practiced using other systems for inflating the air bags and using other materials such as rubber and plastic for fabricating the air bags.

Having thus set forth the nature of my invention, what I claim as new and desire to secure by Letters Patent of the United States is:

1. A streamline afterbody for attachment to the ejection seat of a high performance aircraft, comprising a support pallet fixedly attached to the back of the ejection seat, a rigid skin cover over said pallet, a plurality of inflatable air bags attached to said skin cover, said air bags being fully deflated when the ejection seat is in position in the cockpit of the aircraft, said inflatable air bags being arranged in two vertical parallel rows for rearward extension from the back of the ejection seat, and means for inflating said air bags during ejection of the seat from the aircraft to produce a rearwardly extending steamline afterbody for stabilizing the seat and reducing aerodynamic drag after ejection from the aircraft.

2. The streamline afterbody for attachment to the ejection seat of a high performance aircraft as defined in claim 1 wherein said inflatable air bags are positioned in two vertical rows of five each and inflate sequentially from top to bottom as the seat is ejected from the cockpit with the upper bags inflating first and the lower bags fully inflating after the seat leaves the cockpit.

3. The streamline afterbody for attachment to the ejection seat of a high performance aircraft as defined in claim 2 wherein said inflatable air bags are elliptical in cross section and fabricated of a flexible airtight fabric.

* * * * *